US008118150B2

(12) United States Patent
Abe et al.

(10) Patent No.: US 8,118,150 B2
(45) Date of Patent: Feb. 21, 2012

(54) MANAGEMENT SYSTEM FOR GAME ARCADE

(75) Inventors: Hiroshi Abe, Iwatsuki (JP); Masaru Miyaji, Iwatsuki (JP)

(73) Assignee: Asahi Seiko Co., Ltd, Tokyo (JP)

( * ) Notice: Subject to any disclaimer, the term of this patent is extended or adjusted under 35 U.S.C. 154(b) by 1730 days.

(21) Appl. No.: 10/570,361

(22) PCT Filed: May 27, 2005

(86) PCT No.: PCT/JP2005/009742

§ 371 (c)(1), (2), (4) Date: Mar. 1, 2006

(87) PCT Pub. No.: WO2005/115572

PCT Pub. Date: Dec. 8, 2005

(65) Prior Publication Data

US 2008/0133254 A1 Jun. 5, 2008

(30) Foreign Application Priority Data

May 28, 2004 (JP) ................................ 2004-158945

(51) Int. Cl.
*G07F 7/04* (2006.01)
*G06F 17/00* (2006.01)

(52) U.S. Cl. ............................ 194/206; 902/23; 463/42

(58) Field of Classification Search .................. 194/206; 902/1, 7, 23; 340/539.22; 375/134; 707/623; 709/211
See application file for complete search history.

(56) References Cited

U.S. PATENT DOCUMENTS 5,222,583 A * 6/1993 Bergmann et al. ............ 194/206
5,313,664 A * 5/1994 Sugiyama et al. .............. 705/21
7,672,257 B2 * 3/2010 Mahany et al. ............... 370/310
2005/0136882 A1 * 6/2005 Boulton ..................... 455/343.4
2006/0271487 A1 * 11/2006 Ando et al. ..................... 705/51

FOREIGN PATENT DOCUMENTS

JP 03-235531 10/1991
JP 6-59037 B2 8/1994
JP 06-312061 11/1994
JP 7-321803 12/1995
JP 8-15504 A2 2/1996
JP 11-355832 12/1999
JP 2003-87367 3/2003

* cited by examiner

*Primary Examiner* — Mark Beauchaine
(74) *Attorney, Agent, or Firm* — McGlew and Tuttle, P.C.

(57) ABSTRACT

The present invention is to provide a management system for a game arcade which does not decrease authenticity of money information, and is manageable without changing setting even if the number of a game machine is increased.

A transmitting side includes money identification units, a slave processing unit connected to each money identification unit, and a slave wireless communication unit connected to each slave processing unit. A receiving side includes a master processing unit, and a master wireless communication unit connected to the master processing unit and communicating with the slave wireless communication unit. The system establishes a communication channel between the master wireless communication unit and the slave wireless communication unit, and the slave processing unit transmits the money information and the check information to the slave wireless communication unit. The system checks the authenticity of the check information corresponding to the received money information, and stores in the master processing unit the money information corresponding to the check information detected as a current money.

4 Claims, 7 Drawing Sheets

MANAGEMENT SYSTEM FOR GAME ARCADE

This application is a U.S. national stage entry of co-pending International Application No. PCT/JP2005/009742 filed on May 27, 2005 which designates the United States, and claims priority to Japanese Patent Application No. 2004-158945 filed on May 28, 2004.

BACKGROUND OF THE INVENTION

1. Field of the Invention

The present invention relates to a management system for a game arcade using wireless communication, and more particularly to a management system for a game arcade which does not need to change any settings even if a game machine is increased or decreased. Furthermore, the present invention relates to a management system for a game arcade, which can be used for a game machine having not a power source.

2. Description of the Related Art

It is known that a management system uses wireless communication in a game arcade so that information of a money put into a game machine or a running state of the game machine is in controllable in the game arcade. In the present specification, the term "game machine" includes a pachinko machine, a pinball machine fitted with a slot machine mechanism, a slot machine, an amusement game machine, etc.

For example, such management system comprises a money identification unit at least authenticating money for each game machine, a slave processing unit connected to the money identification unit, a slave wireless communication unit connected to the slave processing unit, a master processing unit having at least a money information storage section, and a master wireless communication unit connected to the master processing unit and communicating with the slave wireless communication unit. Such is disclosed by the following Patent Document 1.

Patent Document 1: Japanese Patent Application Kokai Publication No. Hei 6-312061 (Kokoku Publication No. Hei 8-15504) (See FIG. 2 and Pages 2-3).

DISCLOSURE OF THE INVENTION

Problem to be Solved by the Invention

In the game arcade, a layout is frequently changed to place newly popular game machines or to improve usability so as to respond to customers' requests. Since the game machine uses a microprocessor and an electromagnetic actuator for control thereof, the wireless communication between the master wireless communication unit and the slave wireless communication unit is badly influenced by them. For example, a communication error occurs due to noise generated from them. In other words, though the money information was properly communicated formerly, the unexpected communication error happens because of the frequent layout change which is typical of the game arcade, so that the reliability of the important money information is damaged.

The problem to be solved by the present invention, therefore, is to prevent the reliability of the money information being lowered on the wireless communication because of the above typical circumstances in the game arcade.

Means for Solving the Problem

According to one aspect of the invention, there is provided a management system for a game arcade, which does not make reliability of money information lower when the money information is communicated on the wireless in the game arcade. According to another aspect of the invention, there is provided a management system for a game arcade, which is controllable without changing settings even if the game machine increases in number.

For attaining the above objects, a management system for a game arcade according to the present invention of claim 1 is constituted as follows. The management system for a game arcade has a plurality of money identification units at least authenticating money, slave processing units connected to the money identification units respectively, slave wireless communication units connected to the slave processing units respectively, a master processing unit having at least a money information storage section, and a master wireless communication unit connected to the master processing unit and communicating with the slave wireless communication units, the management system for a game arcade comprising: a communication channel establishment process for establishing a communication channel between the master wireless communication unit and the slave wireless communication units; a slave transmission process for transmitting the money information and check information to the master wireless communication unit from the slave processing unit; a check process for checking authenticity of the check information corresponding to the money information received in the slave transmission process; and a storage process for storing in the master processing unit the authentic money information corresponding to the check information checked in the check process.

In the above structure, when the money is put into the money identification unit of the game machine, the slave processing unit stores the money information. Specifically, the information of denomination and the number of money are stored. In the case where the denomination is one type, for example, a 100 yen coin, and the game machine can be used by receiving only such coin, only the number of coins received may be stored. The communication channel between the master wireless communication unit and the slave wireless communication unit is established in the communication channel establishment process. After the communication channel is established, the slave processing unit transmits the stored money information and the stored check information via the slave wireless communication unit in the slave transmission process. The received check information is analyzed and the authenticity thereof is checked in the check process of the master processing unit. If the check information is decided as true, the money information received together with the check information is also regarded as true and is stored in the master processing unit in the storage process. Various types of processes are executed based on the money information stored in the master processing unit. Therefore, since the money information received together with the check information is stored based on the authenticity of the check information, the reliability of the money information is enhanced.

According to claim 2, the management system for a game arcade in claim 1 is characterized in that the master wireless communication unit and the slave wireless communication unit have a plurality of corresponding communication channels, the master processing unit searches a free channel of the master wireless communication unit and selects the first free channel, and then the carrier signal is outputted using this channel, and the slave processing unit sequentially switches the communication channels of the slave wireless communication unit and fixes the communication channel to that of the carrier signal when the carrier signal is detected.

In the above structure, the master wireless communication unit and the slave wireless communication unit have a plurality of communication channels. For example, in the case where one channel is used oddly under noise circumstances or crosstalk circumstances with another wireless system, the slave wireless communication unit and the master wireless communication unit can be communicated with each other by using another channel. Therefore, the money information in the slave processing unit can be transmitted timely to the master processing unit, then no trouble occurs.

According to claim 3, the management system for a game arcade in claim 1 is characterized in that the slave processing unit has a battery for operation and a voltage check means for the battery, and a battery check process outputs an abnormal signal to the master processing unit when the voltage check means detects an abnormal voltage.

In the above structure, the slave processing unit is operated by the battery. Therefore, the slave processing unit can be used in a game machine which does not have a commercial power source. Since the slave processing unit is also used together with the wireless communication unit, the game machine can be made wireless. Therefore, even if the position of the game machine is frequently moved, the layout can be changed without considering the wiring.

According to claim 4, the management system for a game arcade in claim 1 is characterized in that the slave processing unit stores a count value of money and transmits it to the master processing unit.

In the above structure, the most recent count value of money is stored in the slave processing unit. Thus, even if the wireless communication cannot be carried out because of the trouble of the wireless communication unit or the cross talk, the slave processing unit stores the most recent money count value. When the wireless communication is restored, since the most recent money count value in the slave processing unit is transmitted to the master processing unit, there is no problem in the money data process.

BEST MODE FOR CARRYING OUT OF THE INVENTION

The management system for a game arcade has a plurality of money identification units at least authenticating money, slave processing units connected to the money identification units respectively, slave wireless communication units connected to the slave processing units respectively, a master processing unit having at least a money information storage section, and a master wireless communication unit connected to the master processing unit and communicating with the slave wireless communication units, the management system being characterized in that: the master processing unit has a master request process for outputting a plurality of transmission request signals via the master wireless communication unit; the slave processing unit has a slave transmission process for transmitting the money information and a check information to the master wireless communication unit responding to each of the plurality of transmission request signals via the slave wireless communication unit; and the system comprising: a check process for checking authenticity of the check information corresponding to the money information received in the slave transmission process; and a storage process for storing in the master processing unit the authentic money information corresponding to the check information checked in the check process. The management system for a game arcade also is that the master wireless communication unit and the slave wireless communication unit also have a plurality of corresponding communication channels, the master processing unit searches a free channel of the master wireless communication unit and selects the first free channel, then the carrier signal is outputted using this channel, and the slave processing unit sequentially switches the communication channels of the slave wireless communication unit and fixes the communication channel to that of the carrier signal when the carrier signal is detected. Further, the management system for a game arcade is that the slave processing unit has a battery for operation and a voltage check means for the battery, and a battery check process outputs an abnormal signal to the master processing unit when the voltage check means detects abnormal voltage.

Embodiments

FIG. 1 illustrates a schematic view of a management system for a game arcade according to the present invention. A money identification unit 102, which checks authenticity of money put thereinto, receives current money therein and returns base money, is installed in each of game machines 100-1 to 100-N. The money identification unit 102 has a function for identifying authenticity of a coin put thereinto in case of the identification unit for a coin; a function identifying authenticity and denomination of paper money put thereinto in case of the identification unit for paper money; a function for identifying authenticity of a prepaid card, detecting an amount of money stored therein and writing a reduced amount of money in case of the identification unit for a prepaid card; or a function for identifying authenticity of an IC coin put thereinto, detecting an amount of money stored therein and writing a reduced amount of money in case of the identification unit for an IC coin.

As explained in detail, the money identification unit includes a coin identification unit, a paper money identification unit, a prepaid card identification unit, an IC coin identification unit, and a combination thereof. The coin identification unit includes a mechanical type coin identification unit which mechanically identifies physical characteristics of one type coin. There is also an electrical type coin identification unit which electrically, optically or acoustically detects and identifies physical characteristics of a coin. In the case where the electrical type coin identification unit is used, it can identify the authenticity and denomination of many coins.

Further, there is a paper money identification unit which electrically or optically detects physical characteristics of paper money and identifies authenticity and denomination of paper money. Furthermore, there is a card identification unit which authenticates a prepaid card and reads money amount information stored therein. Moreover, there is an IC coin identification unit which authenticates an IC coin and reads money amount information stored therein. Though the present invention may be applicable to all the above money identification units, the following embodiment of the invention is explained in the case where the mechanical type coin identification unit is applied thereto.

The mechanical type coin identification unit is explained in detail with reference to FIG. 2. The mechanical type coin identification unit 104 includes a coin slot 106, a coin identification part 108, a current coin passage 110, an accounting sensor 112, a return slot 114 and a return lever 116. That is, when a coin 118 is put into the coin slot 106, the diameter of the coin having large or small diameter, which is a base coin is mechanically detected, and the base coin is returned to the return slot 114. If the diameter of the coin 118 is detected as a current coin, the coin 118 is led to a safe (not shown) through the current coin passage 110.

In the case where the coin 118 presses a contact 120 of the accounting sensor 112 on the way of the movement, a switch 122 in the accounting sensor 112 illustrated in FIG. 3, which is a schematic circuit diagram of the accounting sensor, is turned on and the accounting sensor 112 outputs the accounting signal RS. When the coin 118 free falls through the current coin passage 110, the contact 120 is constituted such that the coin 118 is contacted therewith for a predetermined time or more, or a signal is outputted for a predetermined time responding to receiving one accounting signal RS. In other words, the switch 122 is constituted to be ON for a predetermined time, for example, 10 milliseconds or more.

An example of a circuit structure of the accounting sensor 112 is explained with reference to FIG. 3. A light emitting diode 126 in a photocoupler 124 is connected in series to the switch 122. A signal terminal 130 is connected to an input side of a phototransistor 128 in the photocoupler 124. A plus terminal of each of the light emitting diode 126 and the phototransistor 128 is connected to a plus terminal of a battery, for example, a commercial dry battery 132, and a minus terminal of each of the light emitting diode and the phototransistor is grounded.

Therefore, when the switch 122 is turned on, the light emitting diode 126 is emitted. Since the phototransistor 128 is in electrical continuity in response to such emitted light, the accounting signal RS is outputted to the signal terminal 130. Thus, in the case where the mechanical type coin identification unit 104 is used, a signal meaning that one coin having a predetermined amount of money is passed can be obtained. In other words, this signal is the accounting signal RS.

Next, a slave processing unit 140 is explained with reference to FIG. 2. The slave processing unit 140 receives the accounting signal from the money identification unit 102 (the mechanical type coin identification unit 104). That is, the slave processing unit 140 is mounted on the upper side of each of game machines 100-1 to 100-N. Since the slave processing unit 140 is mounted on the upper side, the slave processing unit can communicate with a master communication unit 156 explained later without being interrupted by chassis of the other game machines.

The slave processing unit 140 includes a slave microprocessor (MPU) 142, a battery 144, a battery check unit 146 and a display unit 148. The slave MPU 142 includes a slave internal clock 149, and carries out a predetermined process while storing a data in a RAM (not shown) as needed based on a program stored in a ROM (not shown) in accordance with a clock signal.

In this embodiment, money information in which the accounting signal RS is counted up is stored. The date and time of the received accounting signal RS and/or the uncounted accounting signal RS may also be stored. The battery 144 is, for example, a commercial inexpensive dry battery, which can be used in common with the battery 132 of the accounting sensor 112.

The battery check unit 146 has a function which checks whether the battery 144 has voltage sufficient to drive the MPU 142, etc., and if not, the battery check unit outputs a battery change request signal CB. The battery check unit is desirably constituted as illustrated in a schematic circuit diagram of the battery check unit in FIG. 4, in which a switching device 148 and a resistor 151 are connected in series to the battery 144, a voltmeter 152 is connected in parallel to the resistor 151, and the output of the voltmeter 152 is utilized.

However, the battery check unit 146 may detect indirectly the voltage in accordance with the number of times when a slave communication unit 150 communicates, which slave communication unit consumes the most electric power as explained later. In other words, the battery check unit 146 may be constituted by software.

The display unit 148 displays the count number stored by MPU 142, but this display unit 148 may not be disposed. Further, the battery check unit 146 may not be disposed if the battery is periodically changed. However, if the battery check unit 146 is installed, it is advantageous to use effectively a capacity of the battery 144.

Next, the slave wireless communication unit 150 is explained with reference again to FIG. 2. The slave wireless communication unit 150 has a function to wirelessly transmit the money information, that is, the accounting signal RS by wirelessly communicating with the master wireless communication unit 154. Thus, a radio wave system, an optical wireless system, an acoustic wave system, etc. can be utilized as a communication system. However, a specific low power wireless communication system is the most preferable because it is small sized, inexpensive, and low power consumption. The slave wireless communication unit 150 has a plurality of communication channels which have different frequencies for preventing crosstalk generated by an outside radio wave, etc. In this embodiment, five channels CCH1 to CCH5 are provided. Additionally, the slave wireless communication unit 150 has an antenna 141.

Next, the master wireless communication unit 154 is explained. The master wireless communication unit 154 has a function to communicate with the slave communication unit 150. Thus, it has master communication channels PCH1 to PCH5 which correspond to the slave communication channels CCH1 to CCH5. The many master wireless communication units 154 are disposed to receive certainly the money information from the slave wireless communication unit 150. Additionally, the master wireless communication unit 154 has an antenna 153.

In the illustrated example, the master wireless communication unit 154 includes, for example, at least two communication units, that is, a first master wireless communication unit 154A and a second master wireless communication unit 154B. The master wireless communication unit 154 can also be constituted by three or more wireless communication units. However, it may be constituted by only one master wireless communication unit. In this case, the master processing unit 156 explained later is one.

The first master wireless communication unit 154A and the second master wireless communication unit 154B are connected to the master processing unit 156. Specifically, those are connected to a first master processing unit 156A and a second master processing unit 156B, respectively and are made to be unified. The first master processing unit 156A and the second master processing unit 156B are preferably disposed on a ceiling in a game arcade. This is because space where radio wave shieldings are comparatively few can be used to the wireless communication coupled with the slave processing unit 140 mounted on each top of the game machines 100-1 to 100-N.

The master processing units 156A and 156B include master clocks 159A and 159B, master microprocessors (MPUs) 158A and 158B, master displays 160A and 160B, and communication interface circuits 164A and 164B with a host computer 162, respectively.

The master MPUs 158A and 158B write into a RAM (not shown) as needed based on a program stored in a ROM (not shown) in accordance with the master clocks 159A and 159B, and the master MPUs carry out a predetermined process. Then the master MPUs transmit the money information wirelessly received from the slave wireless processing unit 150 to the host computer 162 via the interface circuits 164A and 164B.

The host computer 162 carries out a predetermined process in accordance with the money information from the first master processing unit 156A and the second master processing unit 156B. The host computer 162 carries out a predetermined process in accordance with the clock signal of the host clock 166. Such host clock 166 is the same frequency as that of the master clocks 159A and 159B, and the slave clock 149, but a few differences may be allowed because of individual difference.

Next, the operation of the present embodiment of the invention is explained with reference to flow charts of FIGS. 5 to 8 and timing charts of FIGS. 9 and 10. When the current coin 118 is put into the coin identification unit 104 of the game machine 100-1, the accounting sensor 112 outputs the accounting signal RS with a predetermined time width. As illustrated in the flow chart of FIG. 7, the slave processing unit 140 detects in a step S11 whether a first predetermined time PT1 has passed or not, and where the first predetermined time PT1 has passed, the slave processing unit outputs an accounting signal confirmation signal TM.

The first predetermined time PT1 is outputted at least twice within the time width of the accounting signal RS. For example, in the case where the width of the accounting signal RS is at least 10 milliseconds, the first predetermined time PT1 is 4 milliseconds. However, it may be preferable to be constituted such that three times or more of the first predetermined time PT1 may be passed within the width of the accounting signal RS so as to process the information certainly.

During the first predetermined time PT1, only the slave clock 149 is operated at the slave processing unit 140, that is, this is a sleep mode. In the case where there are many first predetermined times PT1, the operation time of the slave MPU 142 increases, and the battery 144 is highly consumed, thus it is preferable to be as few as possible. Therefore, the number of the predetermined time PT1 within the accounting signal RS is preferably three times. In the step S11, if the first predetermined time PT1 has passed, the flow proceeds to a step S12. In the step S12, the accounting signal RS from the accounting sensor 12 is detected whether it exists or not.

If the accounting signal RS does not exist, the flow returns to the step S11, and if the accounting signal RS exists, the flow proceeds to a step S13. In the step S13, the accounting signal RS is counted and the counted value is stored, and then the flow proceeds to a step S14. As explained in detail, when the accounting signal RS is outputted, the slave processing unit 140 adds one (1) to the stored count value, and stores the resulted count value in the RAM. In the step S14, a wireless transmission sequence explained later is carried out, and the flow returns to the step S11.

In the step S11, if the first predetermined time PT1 has not passed, the flow proceeds to the step S15. In the step S15, it is detected whether a second predetermined time PT2 has passed or not. The second predetermined time PT2 is a predetermined time width for detecting whether the battery has the voltage sufficient to drive the slave MPU 142. Therefore, the second predetermined time PT2 is longer than the first predetermined time PT1, for example, one time a day (24 hours).

In the step S15, if the second predetermined time PT2 has not passed, the flow returns to the step S11. If the second predetermined time PT2 has passed in the step S15, the flow proceeds to a step S16, and the voltage outputted from the battery check unit 146 is read out. Specifically, the switch 148 in FIG. 4 is turned on for a predetermined time, and the voltage under the electric current flowing through the resistance 150 is measured by the voltmeter 152, and the measured value is read out.

Next, the voltage is compared with a reference value in a step S17, and detected whether it is larger than the reference value. If the voltage is equal to or larger than the reference value, it is determined as a normal voltage and the flow returns to the step S11. If the voltage is less than the reference value, the flow proceeds to a step S18. In the step S18, the battery change request signal CB is stored in the RAM in the MPU 142, and the flow returns to the step S11. Those steps S16 to S18 are named a battery check process BCP.

Next, the wireless communication sequence is explained with reference to FIGS. 5 to 8. This wireless communication sequence has a function to transmit the stored money information in the slave processing unit 140, the battery change request signal, etc. (hereinafter referred to as "money information") to the host computer 162. The host computer 162 outputs a first communication request signal SR1 having a predetermined width to the first master processing unit 156A at a predetermined period T1 in accordance with the clock signal CS of the embedded host clock 166, and outputs a second communication request signal SR2 to the second master processing unit 156B after a predetermined time t1 from the first communication request signal RS1.

The predetermined period T1 is set to for 10 minutes to 30 minutes, preferably for about 15 minutes in the case where the game machines 100-N are, for example, equal to or less than 250. In other words, the money information of each of the game machines 100-1 to 100N can be transmitted to the host computer 162 two times to four times in one hour. If the predetermined period T1 is short, the money information can be obtained timely, but the transmitting process time of the slave processing unit 140 is increased, and thus resulting in accelerating the consumption of the battery 144.

The first master processing unit 156A, which receives the first communication request signal SR1, wirelessly communicates in accordance with the flow chart in FIG. 5 with the slave processing unit 140 of each the game machines 100-1 to 100-N through the slave wireless communication unit 150, the first master wireless communication unit 154A and the second wireless communication unit 154B, and transmits the money information stored in the slave processing unit 140 to the master processing units 156A and 156B, that is, the host computer 162.

Also, the second master processing unit 156B, which receives the second communication request signal SR2, wirelessly communicates in accordance with the flow chart in FIG. 5 with the slave processing unit 140 of each the game machines 100-1 to 100-N, and receives the money information from the slave processing unit 140 like the first master processing unit 156A.

Next, the wireless communication sequence is explained with reference to flow charts of FIGS. 5 and 6. The first master processing unit 156A, which receives the communication request signal SR1 from the host computer 162, carries out a master request process PRP as illustrated in FIG. 5. Specifically, the master communication unit 154A starts the program illustrated in FIG. 5 at a predetermined time of the clock signal CL1 of the master clock 159A.

First of all, in a step S21, the first channel PCH1 with in the five wireless channels is selected. Next, in a step S22, the received signal from the antenna 153 is filtered predeterminately, and the existence or nonexistence of the radio wave of the channel CH1 is checked. Next, if the radio wave of channel CH1 is detected in a step S23, it is determined that the frequency of the channel CH1 is busy, and then the flow proceeds to a step S24.

In the step S24, the communication channel is changed to another frequency channel PCH2, and then the flow proceeds to a step S25. The communication channel is determined whether it is the last communication channel PCH5 in the step S25, and if not, the flow returns to the step S22. If the communication channel exceeds the last communication channel in the step S25, the flow proceeds to a step S26.

The error signal is outputted in the step S26, and the system becomes a standby state in the step S27. If the flow returns to the step S22, the use of the radio wave of the channel CH2 is checked. In this embodiment, it is assumed that the fifth channel CH5 is not busy. Therefore, if the channel CH5 is not used in the step S22, the flow proceeds to a step S29.

If the game arcade is disposed in a space which is clean of a radio wave, since there is no fear of crosstalk, the number of the channel may be one. However, at an urban area, since various radio waves are transmitted and received, a plurality of channels is preferably employed so that the communication using a channel having a fear of crosstalk is avoided.

In the step S29, after the radio wave of the channel CH5 is turned on, the flow proceeds to a step S30. In the step S30, a channel fixing signal FF is wirelessly transmitted through the master communication unit 154A and the antenna 153. For example, the number "5" which signifies the channel CH5 is continuously outputted as the channel fixing signal FF.

Those steps S21 to S30 are the master request process PRP (a first master request process PRP1). The master request process PRP1 has a preparing function so as to establish the communication between the slave wireless communication unit 150 and the master wireless communication unit 154A. In the same way, the second master processing unit 156B also carries out the transmission request process PRP2 in response to the communication request signal SR2. Those transmission request processes PRP1 and PRP2 are the same process.

On the other hand, the slave processing unit 140 carries out a slave transmission process CSP at a constant period T2 in accordance with the clock signal CCL. This constant period T2 is, for example, 15 minutes, which is the same as the constant period T1. Therefore, the slave processing unit 140 and the slave communication unit 150 carry out the communication process at 15 minute intervals.

Each of the slave processing unit 140 is also structured not to carry out the communication process simultaneously with each other such that a reference signal of the slave processing unit is shifted to, for example, a predetermined time $\Delta t$ from a reference timing ST of the first master clock 159A in FIG. 9 set by a dip switch provided in each slave processing unit 140. Specifically, the slave processing unit is constituted such that the slave transmission process CSP explained later is carried out after a lapse of time $t1+\Delta t$ from the time when the transmission request process PRP1 has finished.

The next transmission request process PRP1 is subjected to be carried out after a lapse of a predetermined time from the time when the former slave transmission process CSP has finished. Therefore, though the power consumption of the slave processing unit 140 is the largest in the slave transmission process CSP, the necessary power consumption is only for the sleep state except in the slave transmission process CSP, then the power consumption is extremely low.

Further, since the period of the slave transmission process CSP is a long period, the frequency of the slave transmission process CSP needing large power consumption is low. That is, the power consumption of the slave processing unit 140 is extremely low, then a commercial inexpensive small battery can be used.

The MPU 142 in the slave processing unit 140 carries out a transmission request process CRP illustrated in FIG. 6 in accordance with the slave clock signal CCL of the slave clock 149. Specifically, the wireless channel is set to CCH1 in a step S41, and then the flow proceeds to the S42. In the step 42, the channel fixing signal FF of the channel CH1 is checked, and then the flow proceeds to a step S43.

In the step S43, if the fixing signal FF of the channel CH1 does not exist, that is, the channel CH1 is busy, the flow proceeds to a step S44 and the wireless channel is set to the next channel CCH2, and then the flow proceeds to a step S45. In the step S45, if the channel exceeds the setting channel number, the flow proceeds to a step S46. The error signal is outputted in the step S46, and then the flow proceeds to a step S47 and the system becomes standby state.

In the step S45, if the channel is within a predetermined channel number, the flow returns to the step S42, and the channel fixing signal FF of the channel CH2 is checked. As explained above, if the channels CCH1 to CCH4 are busy and the number "5" is outputted as the channel fixing signal FF of the channel CCH5, the flow proceeds to a step S48, the radio wave of the channel CH5 is received, and then the flow proceeds to a step S49.

The slave channel fixing signal CFF is outputted in the step S49. That is, the number "5" corresponding to the channel CH5 is sent from the slave communication unit 150 through the antenna 141, and then the flow proceeds to a step S50. This causes that the channel CH5 is fixed to the wireless communication between the master processing unit 156A and the slave processing unit 140. Those steps S41 to S49 are the slave transmission request process CRP. Also, a communication channel detection process CDP is constituted by the master request process PRP and the slave communication request process CRP.

In the communication channel detection process CDP, the money information and another information are transmitted succeedingly from the slave processing unit 140 to the first master processing unit 156A after the wireless communication is established by the communication channel CH5. That is, in the step S50, the identification ID (Identification bracelet), for example, the number "104-1" decided for the game machine 100-1 in advance, specifically for the coin identification unit 104 is outputted. The master processing unit receives the identification ID 104-1 and stores it to the RAM in the master MPU 158A in a step S31.

The flow proceeds the following step S51, and the slave processing unit 140 transmits the count value, specifically the number "1", of the coin stored in the step S13. If the battery change request signal CB is stored, the request signal CB is also transmitted.

Next, in a step S52, a CRC signal (Cyclic Redundancy Check Code) which is the check information outputted by a predetermined process is transmitted, and then the flow proceeds to a step S53. The radio wave of the channel CH5 is turned off in the step S53, and then the wireless transmission process finishes. Thus, those steps S50 to S53 are the slave transmission process CSP.

The following processes are simultaneously carried out in the first master processing unit 156A and the second master processing unit 156B. First of all, the count value and/or the battery change request signal CR is received in a step S32. In the following step S33, the CRC signal which is outputted in the step S52 is received, and then the flow proceeds to a step S34. Thus, the steps S31 to S33 are the slave money information reception process CRP. Next, in the step S34, the CRC signal is analyzed by a predetermined process, and then the flow proceeds to a step S35.

In the step S35, the authenticity of the CRC signal is checked, and if correct, the flow proceeds to a step S36. Thus, the steps S34 and S35 are the check process CCP. In the step S36, the count value or the battery change request signal CB received in the step S32 is outputted to the host computer 162, and it is stored as the first money information CI1 of the first master processing unit 156A. Thus, the step S36 is the storage process STP.

In the step S35, if the CRC signal is decided as an incorrect signal, the flow returns to the step S32 and the accounting signal is newly received. In the second master processing unit 156B, the count value received in the step S32 is transmitted to the host computer 162, and it is stored as the second money information CI2 of the second master processing unit 156B.

The host computer 162 receives the count value in accordance with the flow chart in FIG. 8. That is, in a step S61, it is detected whether the first money information CI1 exists or not, and if exists, the flow proceeds to a step S62. In the step S62, it is detected whether the second money information CI2 exists or not, and if exists, the flow proceeds to a step S63.

In the step S63, it is detected whether the first money information CI1 is the same as the second money information CI2, and if the same, the flow proceeds to a step S64. In the step S64, the first money information CI1 is stored together with the ID code, and the first money information CI1 is used for various processes. In the step S61, if the first money information CI1 does not exist, the flow proceeds to a step S65. In the step S65, if the second money information CI2 exists, the flow proceeds to a step S66.

In the step S66, the second money information CI2 is stored together with the ID code, and the second money information CI2 is used for various processes. In the step S65, if the second memory information CI2 does not exist, the process finishes as there is no money information.

In other words, if the first money information CI1 and the second money information CI2 exist, and if the first money information CI1 exists, the first money information CI1 is stored in the host computer 162, and then it is used for collecting the money in the game machine, changing the battery, complying various statistics, etc. If only the second money information CI2 exists, the second money information CI2 is stored in the host computer 162, and it is used for various processes. Therefore, the most recent count value of the game machine 100-1, that is, the number of the coins 18 put into the money identification unit 102 is stored in the host computer 162.

Where the most recent count value is stored in the slave processing unit 140 like the present embodiment, even if the money information cannot be transmitted because a failure occurs in the master communication unit 154 and/or the slave communication unit 150, when the communication unit is restored, the most recent correct data can be obtained by transmitting the count value stored in the slave processing unit 140.

Further, since the data is transmitted by using a plurality of communication channels of such as the first master communication unit 154A connected to the first master processing unit 156A and the second master communication unit 154B connected to the second master processing unit 156B, even if a failure occurs in one communication channel, the data of another communication channel can be utilized.

When the count value is transmitted from the slave processing unit 140, the date and time information is preferably added thereto. In the case where this system is used for a paper money identification unit, the information of denomination and the information of the number of paper money is transmitted together with the CRC information.

As has been described in the foregoing, according to the invention, in the check process of the master processing unit, since the received check information is analyzed to check its authenticity, and the money information received together therewith is stored based on the authenticity of the check information, the reliability of the money information is enhanced. Since the master wireless communication unit and the slave wireless communication unit have many communication channels in the present invention, even if one communication channel is busy because of crosstalk, etc., the money information can be communicated by using another communication channel, and thus the communication can certainly be conducted at the communication timing. Further, since the master wireless communication unit includes the many master wireless communication units, even if an unexpected error occurs in one wireless communication unit, the money information can be received by another communication unit, and thus the money information can certainly be received.

EXPLANATION OF SYMBOLS

Figure 1:
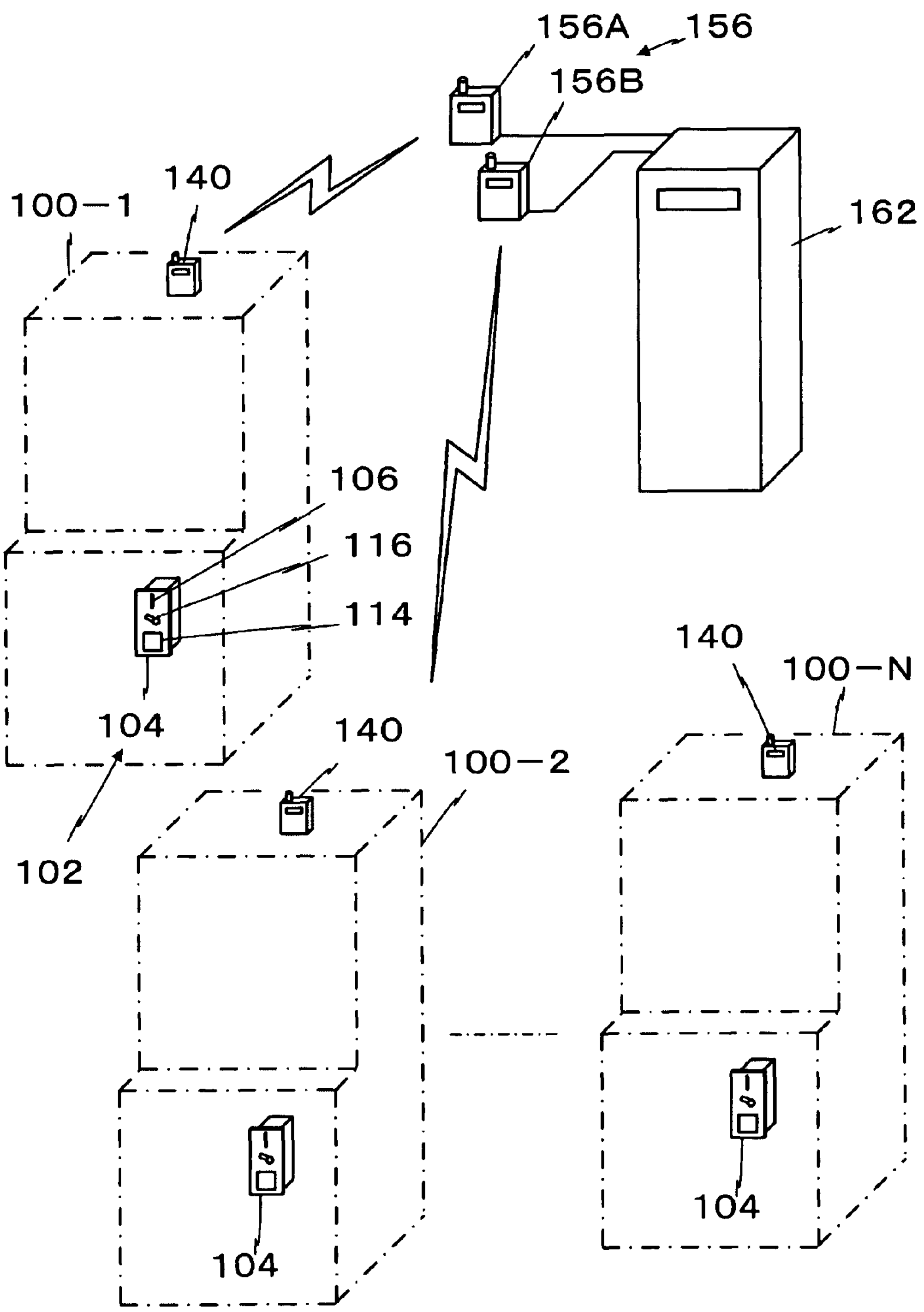
FIG. 1 is a schematic diagram of a management system for a game arcade in an embodiment according to the present invention.
Figure 2:
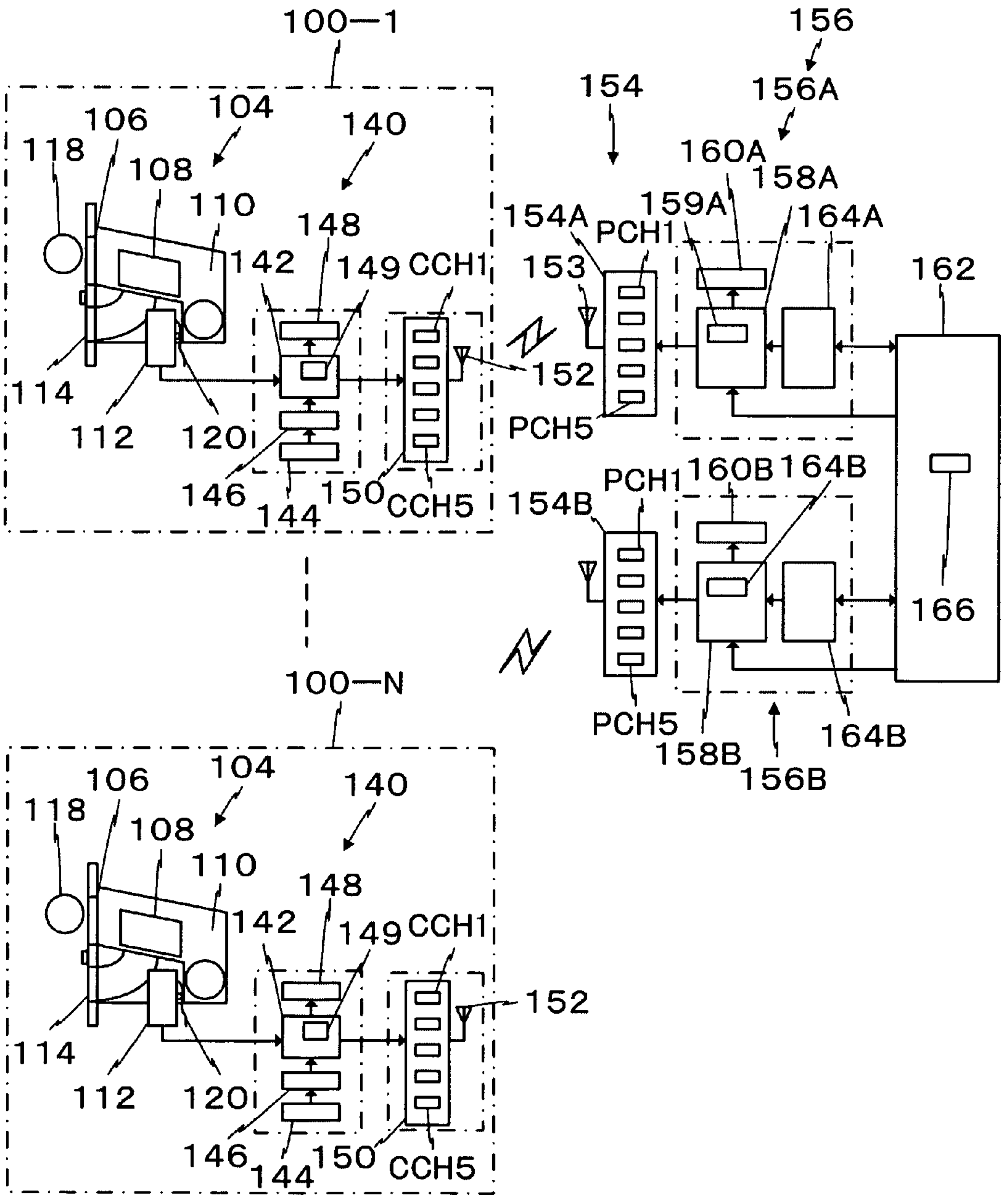
FIG. 2 is a schematic block diagram of a management system for a game arcade in an embodiment according to the present invention.
Figure 3:
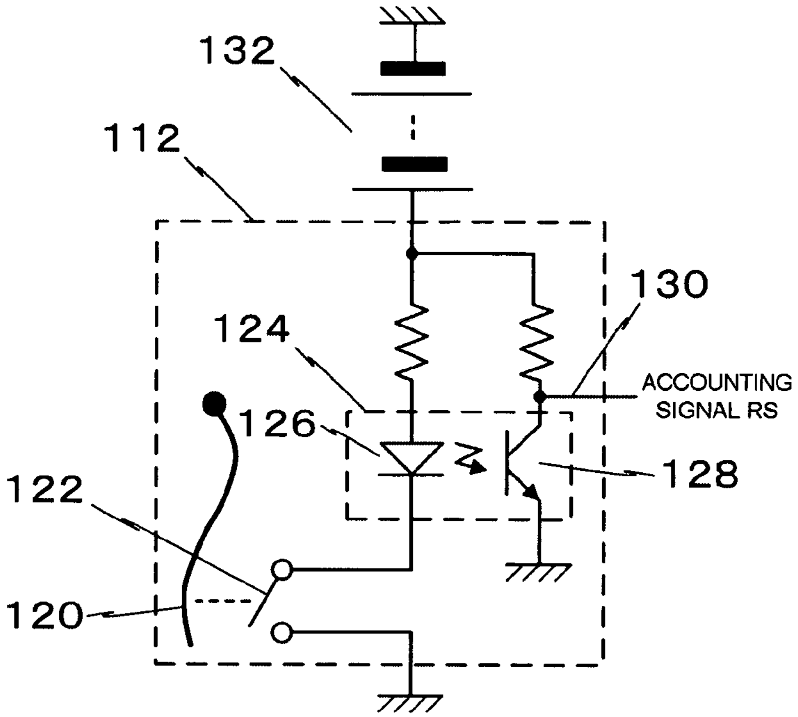
FIG. 3 is a circuit diagram of an accounting sensor in an embodiment according to the present invention.
Figure 4:
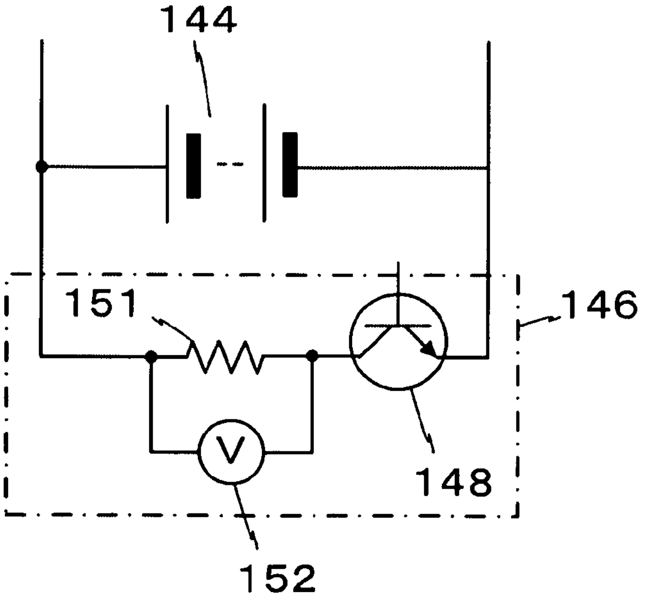
FIG. 4 is a circuit diagram of a battery check unit in an embodiment according to the present invention.
Figure 5:
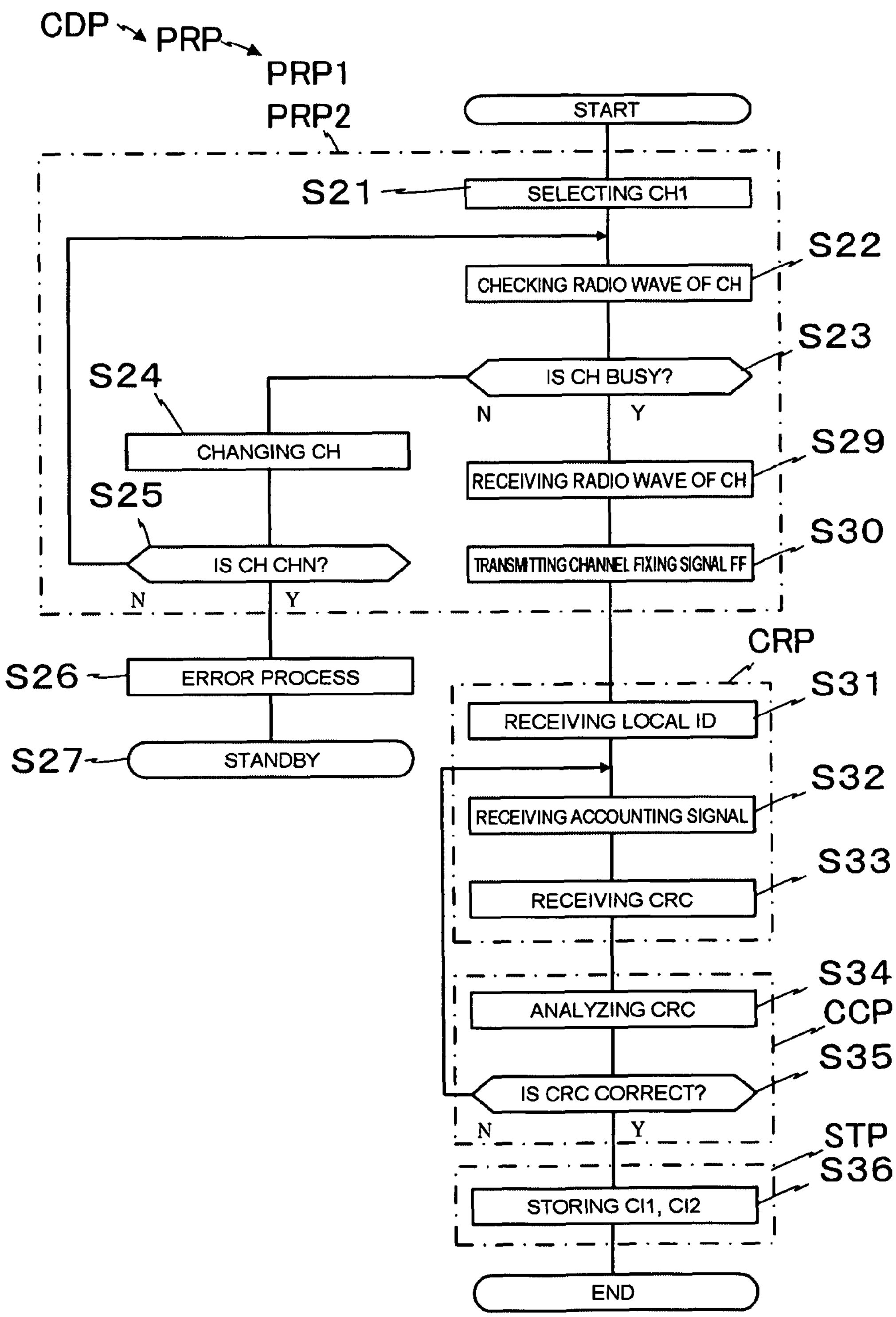
FIG. 5 is a flow chart for explaining a transmission sequence in a master processing unit in an embodiment according to the present invention.
Figure 6:
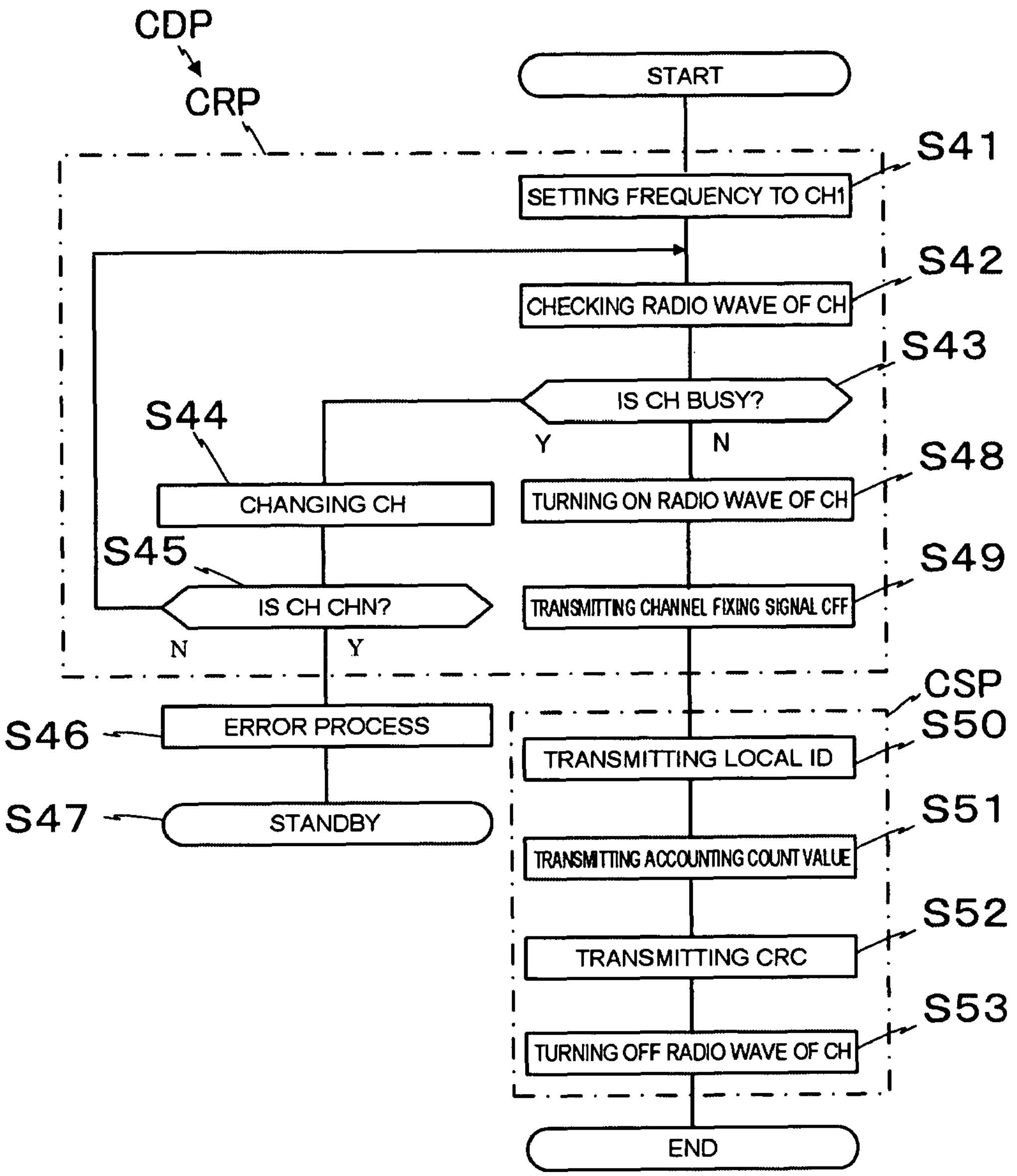
FIG. 6 is a flow chart for explaining a transmission sequence in a slave processing unit in an embodiment according to the present invention.
Figure 7:
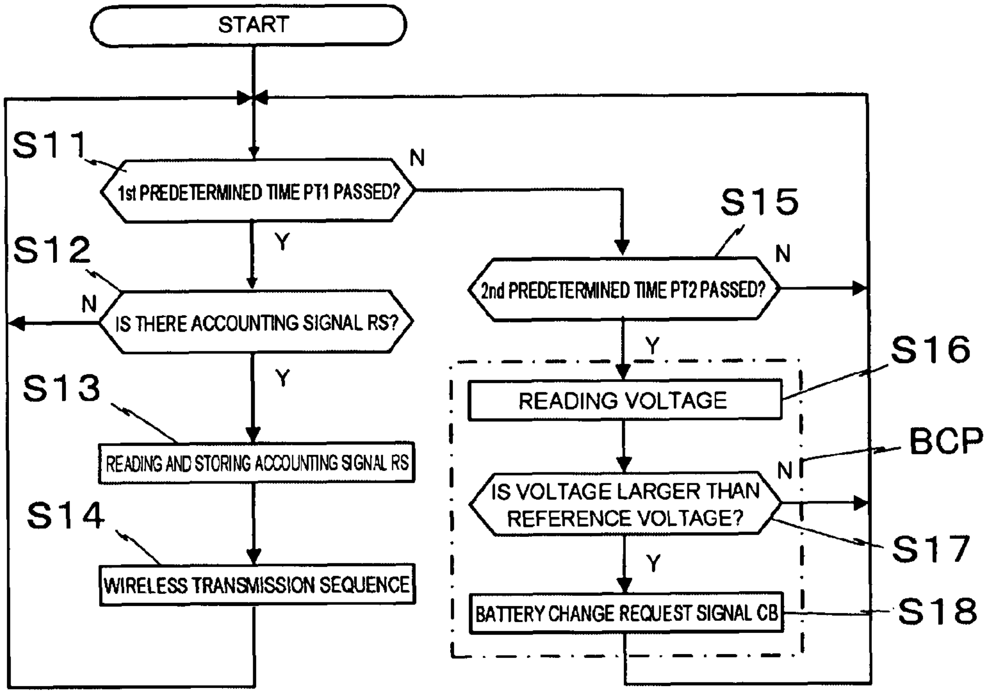
FIG. 7 is a flow chart for explaining a process of a slave processing unit in an embodiment according to the present invention.
Figure 8:
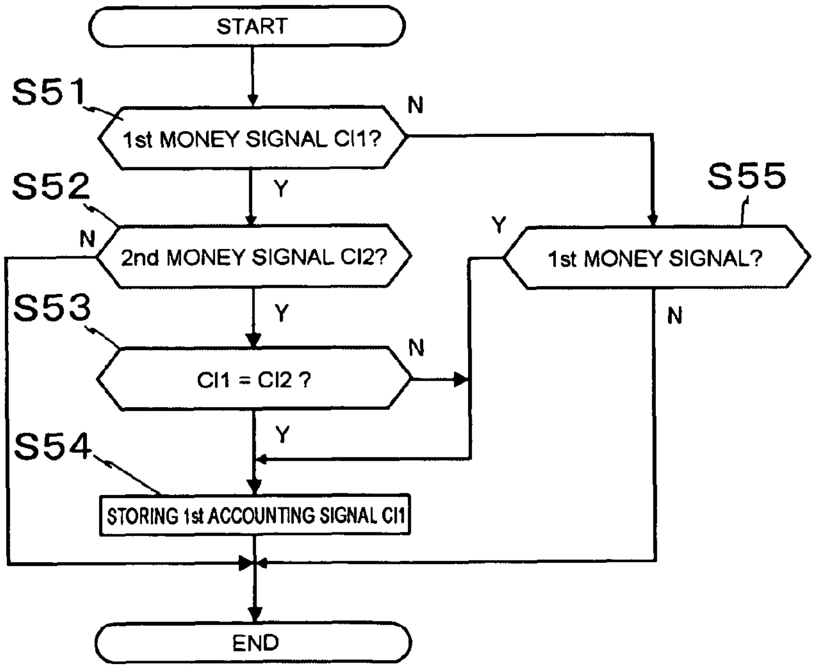
FIG. 8 is a flow chart for explaining a process of a host computer in an embodiment according to the present invention.
Figure 9:
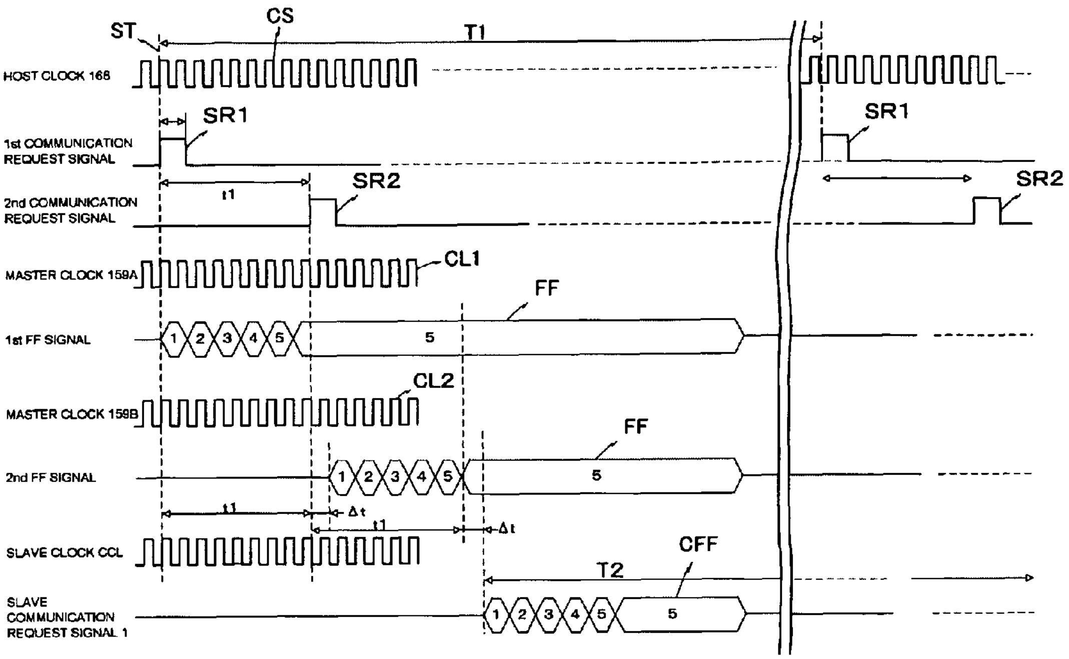
FIG. 9 is a timing chart for explaining a process of an embodiment according to the present invention.
Figure 10:
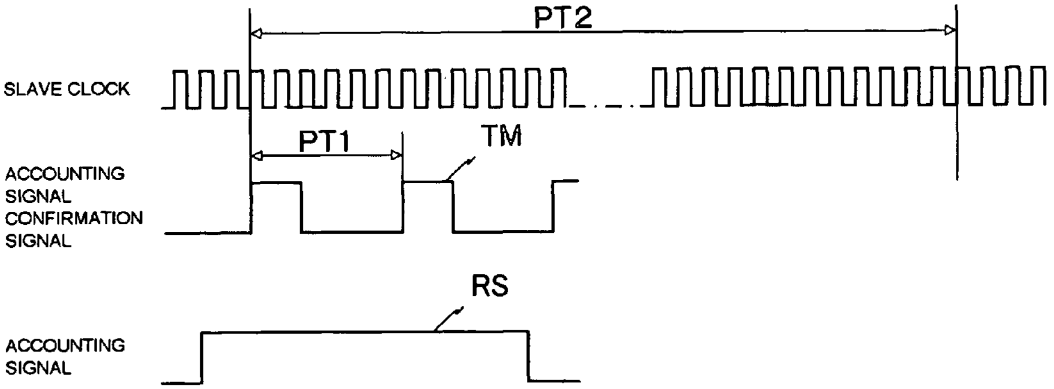
FIG. 10 is a timing chart for explaining a process of a slave processing unit in an embodiment according to the present invention.

| | |
|---|---|
| 102 | a money identification unit |
| 140 | a slave processing unit |
| 144 | a battery |
| 146 | a check unit |
| 150 | a slave wireless communication unit |
| 154 | a master wireless communication unit |
| 156 | a master processing unit |
| CDP | a communication channel detection process |
| CSP | a slave transmission process |
| CCP | a check process |
| STP | a storage process |

-continued

| | |
|---|---|
| CB | an abnormal signal |
| BCP | a battery check process |

What is claimed is:

1. A management system for a game arcade comprising:

a plurality of money identification units detecting authenticity of at least money and obtaining a money information;

a slave processing unit connected to each of the plurality of money identification units and receiving the money information, each said slave processing unit providing an accounting signal of a predetermined time width from said money identification unit as output;

a slave wireless communication unit connected to each slave processing unit;

a plurality of master wireless communication units communicating with the slave wireless communication units and receiving the money information;

a plurality of master processing units receiving the money information from the plurality of master wireless communication units; and a host computer having at least a storage section for money information received from the plurality of master processing units, wherein said plurality of master wireless communication units and each said slave wireless communication unit have a first to an N-th communication channels with different frequencies, said host computer providing a first communication request signal having a predetermined time width as output to one of said plurality of master processing units at a predetermined period in accordance with a clock signal of an embedded host clock, said host computer providing a second communication request signal as output to another of said plurality of master processing units after a predetermined time from said first communication request signal, one of said plurality of master processing units executing a step for selecting a first one of said communication channels, said one of said plurality of master processing units executing a step for checking an existence or nonexistence of a radio wave of said first one of said communication channels, said one of said plurality of master processing units executing a step for changing from said first one of said communication channels to another one of said communication channels when said radio wave of said first one of said communication channels is detected, said one of said plurality of master processing units executing a step for checking the nonexistence of a radio wave sequentially from said first one of said communication channels and said one of said plurality of master processing units providing a fixing signal as output for fixing a first free communication channel, at least one said slave processing unit executing a step for sequentially switching said communication channels of at least one said slave wireless communication unit and for fixing at least one of said communication channels of said at least one said slave wireless communication unit to said fixing signal when said fixing signal is detected, at least one said slave processing unit executing a step for providing a plurality of accounting signal confirmation signals as output during a first predetermined time within the time width of the accounting signal, said at least one said slave processing unit executing a step for storing a counted value of said accounting signal when said accounting signal exists at said one of said accounting confirmation signals provided as output, said at least one said slave processing unit executing a step for transmitting said stored counted value and a check information to at least one of said master wireless communication units, said at least one of said master wireless communication units storing said count value when said at least one of said master wireless communication units determines said check information is true.

2. The management system for a game arcade according to claim 1, wherein at least one of the master wireless communication units and at least one of the slave wireless communication units include a plurality of communication channels corresponding to each other, at least one of the master processing units searches a free channel of one or more of the master wireless communication units and selects a first free channel, and outputs a carrier signal using such channel, and at least one of the slave processing units sequentially switches the communication channels of the slave wireless communication unit, and fixes the communication channel to that of the carrier signal when the carrier signal is detected.

3. A management system for a game arcade comprising:

a plurality of money identification units detecting authenticity of at least money and obtaining a money information;

a plurality of slave processing units, each of said slave processing units being connected to one of said plurality of money identification units and receiving the money information, each of said slave processing units providing an accounting signal of a predetermined time width from one of said money identification units as output;

a plurality of slave wireless communication units, each of said slave wireless communication units being connected to one of said slave processing units;

a plurality of master wireless communication units communicating with the slave wireless communication units and receiving the money information;

a plurality of master processing units receiving the money information from the plurality of master wireless communication units; and a host computer having at least a storage section for money information received from the plurality of master processing units, the plurality of master processing units letting the plurality of master wireless communication units communicate in turn with the slave wireless communication units in accordance with a predetermined instruction from the host computer, and carrying out a communication channel establishment process for establishing a communication channel between the plurality of master wireless communication units and the slave wireless communication units, one or more slave processing units carrying out a slave transmission process for transmitting to one or more master wireless communication units the money information and check information after the communication channel establishment process is carried out, at least one of the master processing units carrying out a check process for checking authenticity of the check information corresponding to the money information received in the slave transmission process, at least one of the master processing units carrying out a storage process for storing in the host computer the money information corresponding to the check information detected as correct in the check process, wherein at least one of the master wireless communication units and at least one of the slave wireless communication units including a plurality of communication channels corresponding to each other, at least one of the master processing units searching a free channel of one or more of the master wireless communication units and selecting a first free channel, and outputting a carrier signal using such channel, at least one of the slave processing units sequentially switching the communication channels of the slave wireless communication unit, and fixing the communication channel to that of the carrier signal when the carrier signal is detected, at least one of said slave processing units providing a plurality of accounting signal confirmation signals as output during a first predetermined time within the time width of the accounting signal, said at least one said slave processing unit storing a counted value of said accounting signal when said accounting signal corresponds to one of said accounting confirmation signals provided as output.

4. A wireless managing method of money information for a game arcade, a managing system comprising:

a plurality of money identification units detecting authenticity of at least one coin;

a slave processing unit connected to each of the plurality of money identification units;

a slave wireless communication unit connected to each slave processing unit;

a master processing unit having at least a money information storage section; and a master wireless communication unit connected to the master processing unit and communicating with at least one of said slave wireless communication units, wherein the master wireless communication unit is connected to the master processing unit and said master wireless communication unit includes at least two master wireless communication units provided at different positions, said master processing unit having a plurality of master processing units connected to each of said at least two master wireless communication units, at least one said slave processing unit providing an accounting signal of a predetermined time width output from the money identification unit upon each passing of the coin decided as a current coin, said master wireless communication unit and at least one said slave wireless communication unit having first to N-th communication channels with different frequencies, a host computer providing a first communication request signal as output, said first communication request signal having a predetermined time width to one of the plurality of master processing units at a predetermined period in accordance with a clock signal of an embedded host clock, said host computer providing a second communication request signal to another of the plurality of master processing units as output after a predetermined time from the first communication request signal, said plurality of master processing units executing, based on a corresponding said first communication request signal or said second communication request signal from the host computer, a step for selecting a first one of said communication channels, said plurality of master processing units executing a step for checking an existence or nonexistence of a radio wave of said first one of said communication channels, said plurality of master processing units executing a step for changing said first one of said communication channels to another one of said communication channels when the radio wave in said first one of said communication channels is detected, said plurality of master processing units executing a step for checking the nonexistence of the radio wave sequentially from said first one of said communication channels and said plurality of master processing units providing a fixing signal for fixing to a first free communication channel as output, at least one said slave processing unit executing a step for sequentially switching the communication channels of at least one said slave wireless communication unit and for fixing one of said communication channels to said fixing signal when said fixing signal is detected, at least one said slave processing unit executing a step for providing a plurality of accounting signal confirmation signals during a first predetermined time within the time width of the accounting signal as output, at least one said slave processing unit executing a step for storing a counted value of the accounting signal when the accounting signal exists at the outputting of the accounting signal confirmation signal, at least one said slave processing unit executing a step for transmitting the stored counted value and a check information to said master wireless communication units, said master wireless communication units executing a step for checking authenticity of the check information corresponding to the counted value received in the transmitting step, said master processing units storing said count value when said master wireless communication units determine said check information is true.

* * * * *